(12) United States Patent
Lee et al.

(10) Patent No.: US 11,919,287 B2
(45) Date of Patent: Mar. 5, 2024

(54) FOLDABLE DISPLAY DEVICE

(71) Applicant: Samsung Display Co., LTD., Gyeonggi-do (KR)

(72) Inventors: Myung-Ki Lee, Seoul (KR); Junkeun Ahn, Chungcheongnam-do (KR); Yewon Cho, Gyeonggi-do (KR); Dongjin Park, Gyeonggi-do (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/864,497

(22) Filed: Jul. 14, 2022

(65) Prior Publication Data
US 2023/0073412 A1 Mar. 9, 2023

(30) Foreign Application Priority Data

Sep. 3, 2021 (KR) .......................... 10-2021-0117665

(51) Int. Cl.
*B32B 7/12* (2006.01)
*B32B 17/06* (2006.01)

(52) U.S. Cl.
CPC ................ *B32B 7/12* (2013.01); *B32B 17/06* (2013.01); *B32B 2307/42* (2013.01);
(Continued)

(58) Field of Classification Search
CPC ....... B32B 7/12; B32B 17/06; B32B 2307/42; B32B 2307/54; B32B 2307/732; B32B 2457/20
See application file for complete search history.

(56) References Cited

U.S. PATENT DOCUMENTS

| 2019/0305256 A1* | 10/2019 | Wu .......................... G02F 1/133 |
| 2020/0052248 A1* | 2/2020 | Cho .................... H10K 50/865 |
| 2022/0291712 A1 | 9/2022 | Baby et al. |

FOREIGN PATENT DOCUMENTS

| KR | 20170020674 A | 2/2017 |
| KR | 20190120465 A | 10/2019 |

(Continued)

OTHER PUBLICATIONS

[NPL-1] Henkel "Loctite® Bonderite® Henkel's Solutions for Touch Panels & Displays", Mar. 2018, <https://dm.henkel-dam.com/is/content/henkel/Henkel_AEDBrochure_TouchPanelDisplay_update_01Mar18pdf>. (Year: 2018).*

(Continued)

*Primary Examiner* — David Sample
*Assistant Examiner* — Donald M Flores, Jr.
(74) *Attorney, Agent, or Firm* — CANTOR COLBURN LLP

(57) ABSTRACT

A foldable display device includes a display panel including a first non-folding area including a bending area and a non-bending area, a folding area connected to the first non-folding area, and a second non-folding area spaced apart from the first non-folding area by the folding area, an adhesive layer disposed on the non-bending area of the display panel and having a first height in a direction perpendicular to a main plane extension direction of the display panel, a polarizing layer disposed on the adhesive layer and a bending protective layer disposed on the bending area of the display panel and having a second height, in the direction, lower than the first height.

23 Claims, 16 Drawing Sheets

(52) U.S. Cl.
CPC ..... *B32B 2307/54* (2013.01); *B32B 2307/732* (2013.01); *B32B 2457/20* (2013.01)

(56) References Cited

FOREIGN PATENT DOCUMENTS

| KR | 20200019301 | A  | 2/2020  |
|----|-------------|----|---------|
| KR | 102176719   | B1 | 11/2020 |
| KR | 20210113547 | A  | 9/2021  |
| WO | 2021041882  | A1 | 3/2021  |

OTHER PUBLICATIONS

Extended European Search Report for Application No. 22191205.8-1224 dated Jan. 26, 2023.

\* cited by examiner

FOLDABLE DISPLAY DEVICE

This application claims priority to Korean Patent Application No. 10-2021-0117665, filed on Sep. 3, 2021, and all the benefits accruing therefrom under 35 U.S.C. § 119, the content of which in its entirety is herein incorporated by reference.

BACKGROUND

1. Field

Embodiments relate to a foldable display device. More particularly, embodiments relate to a foldable display device capable of displaying an image.

2. Description of the Related Art

A display device is manufactured and used in various ways. The display device may display light to provide visual information to a user. The display device may include a liquid crystal display device that emits light using a liquid crystal layer, an inorganic light-emitting display device that emits light using an inorganic light-emitting material, and an organic light-emitting display device that emits light using an organic light-emitting material.

In addition, the display device is manufactured so that a shape of the display device is deformable. A bendable display device, a foldable display device, a rollable display device, etc., are being manufactured and used, for example.

SUMMARY

Embodiments provide a foldable display device having improved electrical characteristics.

Additional features will be set forth in the description which follows, and in part will be apparent from the description, or may be learned by practice of the embodiments.

An embodiment of a foldable display device may include a display panel including a first non-folding area including a bending area and a non-bending area, a folding area connected to the first non-folding area, and a second non-folding area spaced apart from the first non-folding area by the folding area, an adhesive layer disposed on the non-bending area of the display panel and having a first height in a direction perpendicular to a main plane extension direction of the display panel, a polarizing layer disposed on the adhesive layer and a bending protective layer disposed on the bending area of the display panel and having a second height, in the direction, lower than the first height.

In an embodiment, a modulus of the bending protective layer may be greater than about 0 and less than or equal to about 860 megapascals (MPa).

In an embodiment, the modulus of the bending protective layer may increase from a high temperature to a low temperature.

In an embodiment, a modulus of the adhesive layer may be about 0.1 MPa or less

In an embodiment, a modulus of the bending protective layer is greater than about 0 and less than or equal to about 8601V1 Pa, and a modulus of the adhesive layer is about 0.1 MPa or less.

In an embodiment, the bending protective layer is in contact with the adhesive layer.

In an embodiment, the foldable display device may further include a glass disposed on the polarizing layer and a protective layer disposed on the glass.

An embodiment of a foldable display device may include a display panel including a first non-folding area including a bending area and a non-bending area, a folding area connected to the first non-folding area, and a second non-folding area spaced apart from the first non-folding area by the folding area, an adhesive layer disposed on the non-bending area of the display panel and having a first height in a direction perpendicular to a main plane extension direction of the display panel, a polarizing layer disposed on the adhesive layer and a bending protective layer disposed on the bending area of the display panel and having the first height in a first portion adjacent to the adhesive layer and having a second height, in the direction, different from the first height in a second portion spaced apart from the adhesive layer by the first portion.

In an embodiment, In an embodiment, a modulus of the bending protective layer may be greater than about 0 and less than or equal to about 860 MPa.

In an embodiment, the modulus of the bending protective layer may increase from a high temperature to a low temperature.

In an embodiment, a modulus of the adhesive layer may be about 0.1 MPa or less

In an embodiment, a modulus of the bending protective layer is greater than about 0 and less than or equal to about 860 MPa, and a modulus of the adhesive layer is about 0.1 MPa or less.

In an embodiment, the bending protective layer is in contact with the adhesive layer.

In an embodiment, a distance between the adhesive layer and the second portion may be about 50 micrometers (μm) to about 150 μm.

In an embodiment, the second height may be greater than the first height.

In an embodiment, the bending protective layer may gradually increase in height from the first portion to the second portion In an embodiment, a length at which the second portion is spaced apart from the adhesive layer by the first portion may be about 50 μm to about 150 μm.

In an embodiment, the foldable display device may further include a glass disposed on the adhesive layer and protruding outward from the adhesive layer in a direction parallel to the main plane extension direction of the display panel and a protective layer disposed on the glass and protruding outward from the glass in the direction parallel to the main plane extension direction of the display panel.

In an embodiment, the second portion may overlap the protective layer.

In an embodiment, the second portion may overlap the protective layer and the glass.

In an embodiment, the second portion may overlap the protective layer and does not overlap the glass.

An embodiment of a foldable display device may include a display panel including a first non-folding area including a bending area and a non-bending area, a folding area connected to the first non-folding area, and a second non-folding area spaced apart from the first non-folding area by the folding area, an adhesive layer disposed on the non-bending area of the display panel and having a first height in a direction perpendicular to a main plane extension direction of the display panel, a polarizing layer disposed on the adhesive layer and a bending protective layer disposed on the non-bending area of the display panel, having the first height in a first portion adjacent to the adhesive layer, having a second height, in the direction, greater than the first height in a second portion spaced apart from the first portion by the first portion, in contact with the adhesive layer and having a distance between the adhesive layer and the second portion spaced apart from each other by about 50 µm to about 150 µm.

In an embodiment, a modulus of the bending protective layer may be greater than about 0 and less than or equal to about 860 MPa, and a modulus of the adhesive layer may be about 0.1 MPa or less.

A foldable display device may include a display panel including a first non-folding area including a bending area and a non-bending area, a folding area connected to the first non-folding area, and a second non-folding area spaced apart from the first non-folding area by the folding area, an adhesive layer disposed on the non-bending area of the display panel and having a first height in a direction perpendicular to a main plane extension direction of the display panel, a polarizing layer disposed on the adhesive layer and a bending protective layer disposed on the non-bending area of the display panel, having the first height in a first portion adjacent to the adhesive layer, having a second height, in the direction, greater than the first height in a second portion spaced apart from the first portion by the first portion, in contact with the adhesive layer and having a distance between the adhesive layer and the second portion spaced apart from each other by about 50 µm to about 150 µm. A modulus of the bending protective layer may be greater than about 0 and less than about 860 MPa.

Accordingly, when the foldable display device is folded, the possibility of cracks or the like occurring in the bending protective layer may be reduced even when the polarizing layer slips and pressure is applied in a direction in which the bending protective layer is disposed.

It is to be understood that both the foregoing general description and the following detailed description are explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the embodiments.

DETAILED DESCRIPTION

Figure 1:
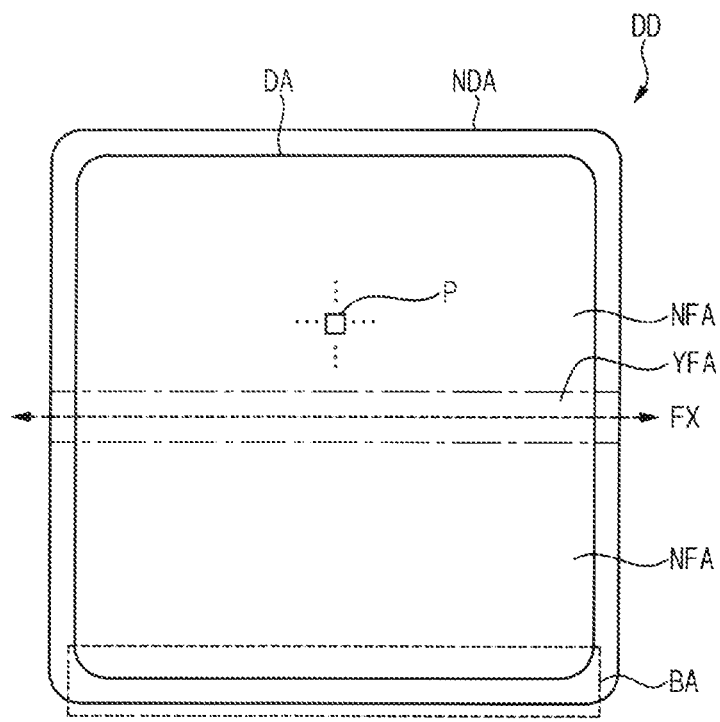
FIGS. 1 and 2 are views illustrating an embodiment of display devices.

Embodiments of the invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout. As used herein, a reference number may indicate a singular element or a plurality of the element. A reference number labeling a singular form of an element within the drawing figures may be used to reference a plurality of the singular element within the text of specification, for example.

Illustrative, non-limiting embodiments will be more clearly understood from the following detailed description in conjunction with the accompanying drawings.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this invention will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/ or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Figure 2:
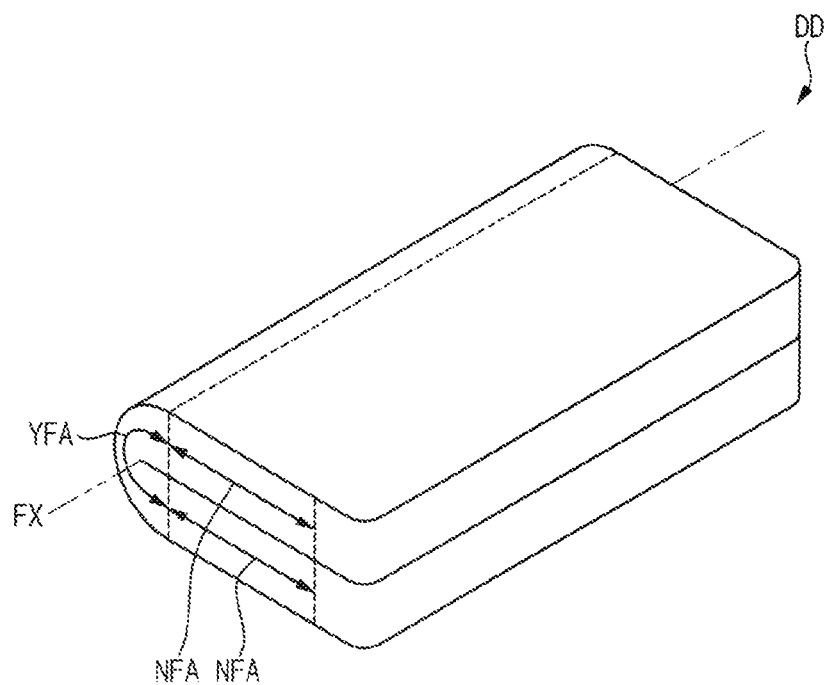

FIGS. 1 and 2 are views illustrating an embodiment of display devices. FIG. 2 may correspond to a diagram illustrating an embodiment in which the display device of FIG. 1 is folded.

Referring to FIG. 1, the display device DD may include a display area DA and a non-display area NDA. The display area DA may be defined as an area that displays an image, and the non-display area NDA may be defined as an area that transmits a signal to display an image in the display area DA.

To this end, a plurality of pixels P may be disposed in the display area DA. The pixels P may be disposed throughout the display area DA. The pixels P may be arranged in various ways. In an embodiment, the pixels P may be disposed throughout the display area DA in a matrix form, for example.

A plurality of drivers may be disposed in the non-display area NDA. In an embodiment, a scan driver, a data driver, a light-emitting driver, a timing controller, etc., may be disposed in the non-display area NDA, for example. The scan driver, the data driver, and the light-emitting driver may transmit signals to the pixels P. The pixels P may emit light based on the signals, and through this, the display device DD may display an image.

The display device DD may correspond to a foldable display device. The display device DD may include a plurality of non-folding areas NFA and a folding area YFA disposed between the non-folding areas NFA. That is, the non-folding areas NFA may be spaced apart from each other with the folding area YFA therebetween. The display device DD may be folded based on the folding axis FX. As the folding area YFA is folded, the display device DD may be folded, and the non-folding area NFA may not be folded.

Referring to FIG. 2, when the display device DD is folded, the folding area YFA may be folded, so that the non-folding areas NFA may be folded to face each other. In some embodiments, the display device DD may be in-folded with the display area DA of FIG. 1 facing each other. In an alternative embodiment, the display device may be out-folded so that the display area DA is disposed at the outer portion.

Referring back to FIG. 1, the pixels P may be disposed in both the folding area YFA and the non-folding areas NFA. That is, the display device DD may display an image overall in the folding area YFA and the non-folding areas NFA.

Although the display device DD is illustrated to display an image from the front in FIG. 1, the display area DA may also display an image from the rear. In an embodiment, when the display device DD is in-folded, an image may be displayed on the rear surface of the display device DD, for example.

The display device DD may include a bending area BA. A driving chip, a circuit board, etc., may be disposed in the bending area BA. The driving chip and the circuit board may be electrically connected to the pixels P to provide a signal for driving the pixels P. In the bending area BA, the flexible substrate may be bent toward the rear surface of the display device DD. Accordingly, the dead space in which the driving chip, the circuit board, etc., are disposed may not be viewed from the front surface of the display device DD.

Figure 3:
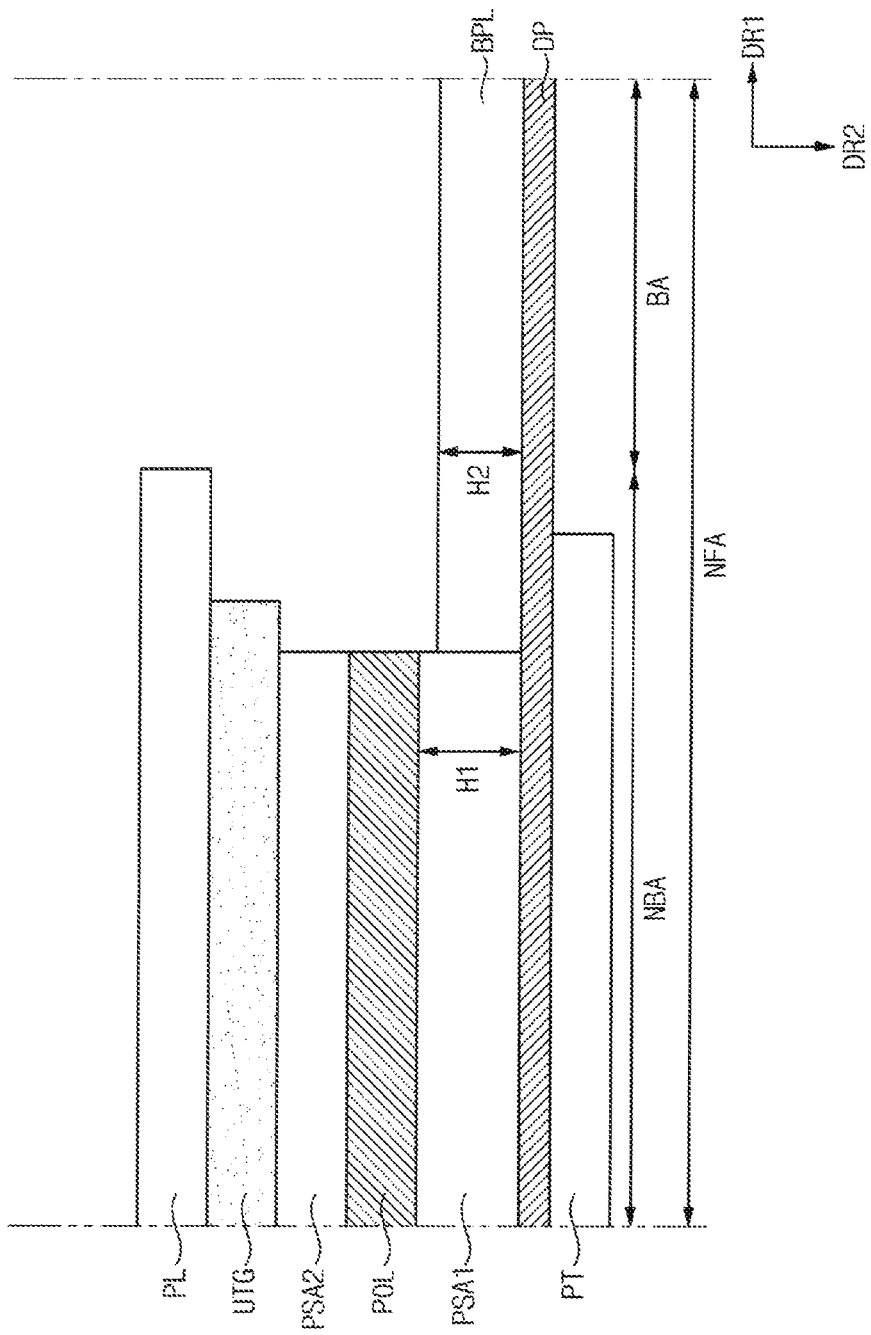
FIG. 3 is a view schematically illustrating a non-folding area including a bending area of the display device of FIG. 1.

FIG. 3 is a view schematically illustrating a non-folding area including a bending area of the display device of FIG. 1.

Referring to FIGS. 1 and 3, the display device DD may include a display panel DP, a first adhesive layer PSA1, a second adhesive layer PSA2, a polarizing layer POL, a bending protective layer BPL, a first protective layer PT, a glass UTG and a second protective layer PL.

Pixels P are disposed on the display panel DP to display an image. The pixels P may include a driving element and a light-emitting element. The light-emitting element may be connected to the driving element to receive a signal. The driving element may include a transistor, a capacitor, or the like. The light-emitting element may include an organic light-emitting diode, an inorganic light-emitting diode, or the like. The structure of the display panel DP will be described later with reference to FIG. 15.

The non-folding area NFA may include a non-bending area NBA and a bending area BA. The first adhesive layer PSA1 may be disposed on the non-folding area NFA of the display panel DP. The first adhesive layer PSA1 may be disposed on the non-bending area NBA. The first adhesive layer PSA1 may adhere the polarizing layer POL to the display panel DP.

The first adhesive layer PSA1 may include various materials having adhesive properties to adhere the display panel DP and the polarizing layer POL. In an embodiment, the first adhesive layer PSA1 may include at least one of an optically transparent adhesive, an optically transparent adhesive resin, a pressure-sensitive adhesive, and an ultraviolet adhesive, for example.

Preferably, the first adhesive layer PSA1 may include a material having a low modulus. In an embodiment, the first adhesive layer PSA1 may include a material having a modulus of about 0.1 megapascal (Mpa) or less, for example.

The first adhesive layer PSA1 may have a first height H1. In an embodiment, the first height H1 may be about 50 micrometers (μm).

The bending protective layer BPL may be disposed on the bending area BA of the display panel DP. The bending protective layer BPL may protect the display panel DP from stress generated when the display panel DP is bent. When the bending protective layer BPL is not present, excessive tensile stress or the like may be applied to conductive layers in the bending area BA as the display panel DP is bent. To prevent this, the bending protective layer BPL may include an acrylic-based resin and/or a urethane-based resin.

The bending protective layer BPL may have a second height H2 lower than the first height H1, and may be disposed in contact with the first adhesive layer PSA1. In an embodiment, the second height H2 may be about 15 μm to about 50 As the bending protective layer BPL has a second height H2 lower than that of the first adhesive layer PSA1, the bending protective layer BPL may not contact the polarizing layer POL. Accordingly, when the display device DD is folded, the polarizing layer POL slips and an impact applied to the bending protective layer BPL may be prevented. When the bending protective layer BPL has a higher height than the first adhesive layer PSA1, the bending protective layer BPL may also be in contact with the polarizing layer POL. In this case, when the display device DD is folded, the polarizing layer POL may slip and an impact may be applied to the bending protective layer BPL.

The bending protective layer BPL may include a material having a lower modulus than that in the related art. The bending protective layer BPL may become harder as the modulus of a material constituting the bending protective layer BPL increases, and may become softer as the modulus of the material constituting the bending protective layer BPL decreases. Conventionally, a material whose modulus decreases from about −20 degrees Celsius to about 60 degrees Celsius is used as a material of the bending protective layer BPL. Conventionally, 'LOCTITE ECCOBOND DS 3318BLX' of Henkel LOCTITE® has been used as the material of the bending protective layer BPL, for example. In an embodiment, the material may have a modulus of about 1600 MPa at about −20 degrees Celsius, and a modulus that converges to zero as it approaches about 60 degrees Celsius, for example.

In an embodiment of the invention, a material having a modulus of about 860 MPa at about −20 degrees Celsius and a modulus converging to 0 as it approaches about 60 degrees Celsius may be used as a material of the bending protective layer BPL. Accordingly, even when an external impact is applied to the bending protective layer BPL, the probability of occurrence of defects such as cracks may be lower than that of the related art.

The polarizing layer POL may be disposed to overlap the non-folding area NFA of the display panel DP. The polarizing layer POL may be disposed on the non-bending area NBA of the display panel DP. The polarizing layer POL may reduce reflection of external light.

The first protective layer PT may be disposed to face the first adhesive layer PSA1 and the bending protective layer BPL with the display panel DP interposed therebetween. The first protective layer PT may block moisture and oxygen penetrating into the display panel DP from a lower surface of the display panel DP. Also, the first protective layer PT may protect the display panel DP from external impact. In an embodiment, the first adhesive layer PSA1 and the bending protective layer BPL are formed or disposed on an upper surface of the display panel DP, and the first protective layer PT are formed or disposed on the lower surface facing the upper surface of the display panel DP, for example.

An opening corresponding to the bending area BA of the display panel DP may be defined in the first protective layer PT. The first protective layer PT may protect the lower surface of the display panel DP, and accordingly, the first protective layer PT may have its own rigidity.

The second adhesive layer PSA2 may be disposed on the polarizing layer POL. The second adhesive layer PSA2 may include substantially the same material as that of the first adhesive layer PSA1. The glass UTG may be adhered to the polarizing layer POL by the second adhesive layer PSA2. In an embodiment, the glass UTG may have a thickness of less than about 100 μm. The thickness of the glass UTG is thin, so the glass UTG may be flexibly folded, and by including the glass component, the glass UTG may be strong against external scratches. In an embodiment, the glass UTG may protrude about 50 μm to about 75 μm to the outward of the polarizing layer POL. That is, the glass UTG may protrude from the polarizing layer POL by about μm to about 75 μm in the first direction DR1.

The second protective layer PL may be disposed on the glass UTG. The second protective layer PL may protect lower components including the glass UTG on the glass UTG. In an embodiment, the second protective layer PL may protrude from about 320 μm to about 350 μm to the outside of the polarizing layer POL. That is, the second protective layer PL may protrude about 320 μm to about 350 μm in the first direction DR1 than the polarizing layer POL.

Figure 4:
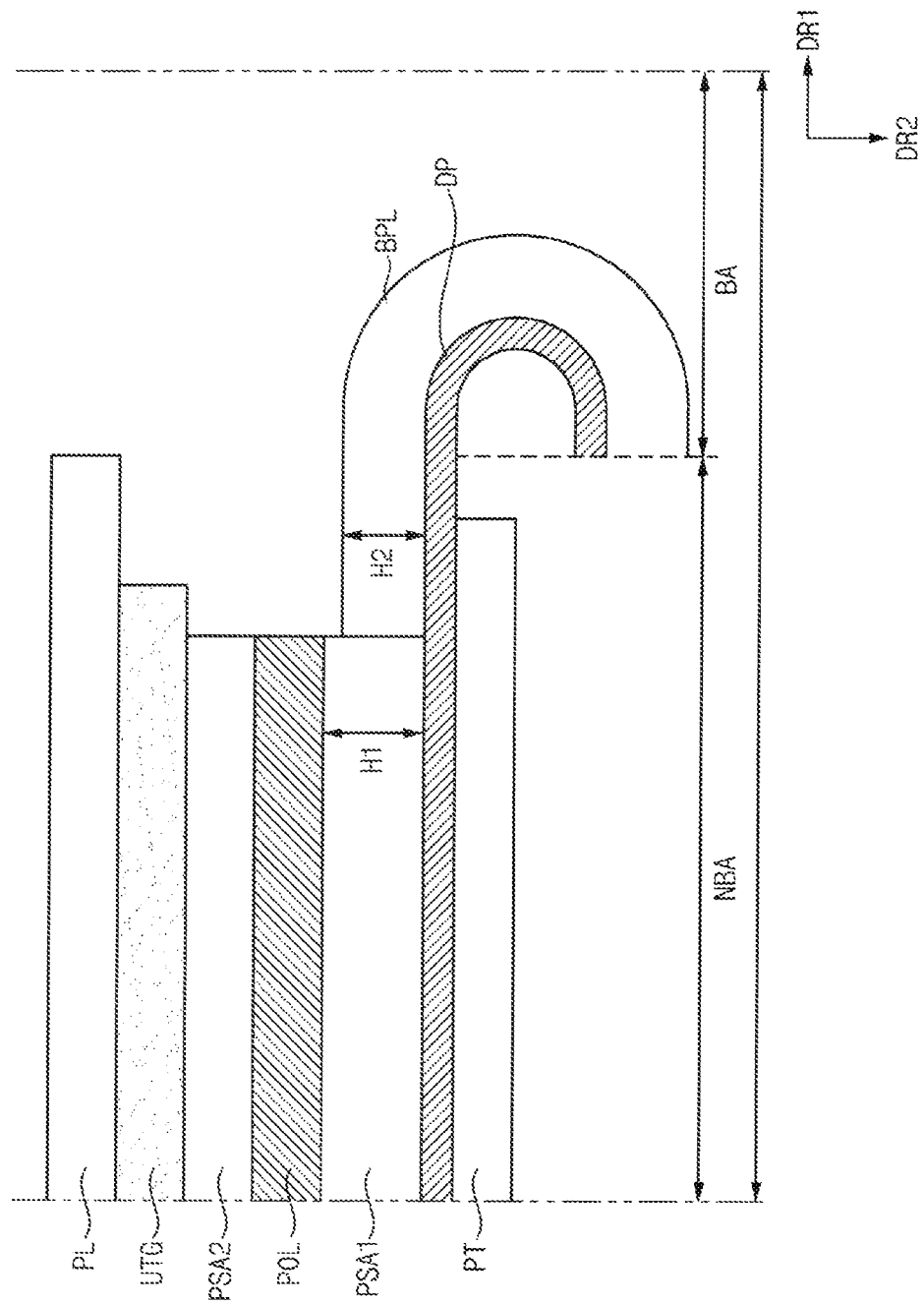
FIG. 4 is a view illustrating that the bending area of FIG. 3 is bent.

FIG. 4 is a view illustrating that the bending area of FIG. 3 is bent.

Referring to FIGS. 1 and 4, the display panel DP may include a non-bending area NBA and a bending area BA extending from the non-bending area NBA in the first direction DR1. The bending area BA of the display panel DP may be bent in a second direction DR2 perpendicular to the first direction DR1. A driving chip may be disposed on one side of the bending area BA. As the display panel DP is bent, the driving chip may be disposed on the rear surface of the display device DD, and thus a dead space of the display device may be reduced. The bending area BA of the display device DD of FIGS. 5 to 14 may also be bent in the second direction DR2.

FIGS. 5 to 14 are views schematically illustrating a bending area and a non-folding area of the display device of FIG. 1.

Figure 5:
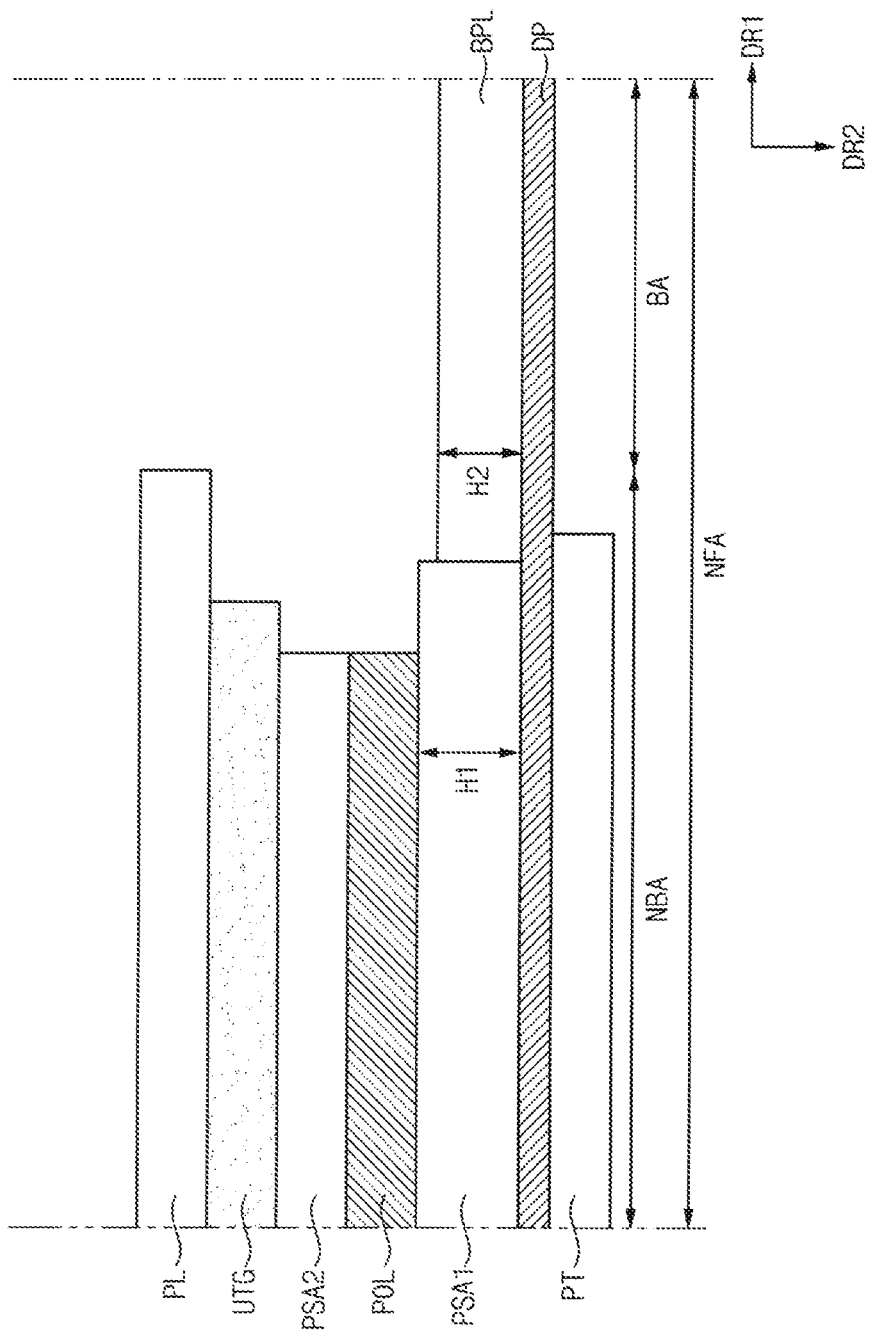
FIGS. 5 to 14 are views schematically illustrating a bending area and a non-folding area of the display device of FIG. 1.

Referring to FIGS. 1 and 5, the display device DD may include a display panel DP, a first adhesive layer PSA1, a second adhesive layer PSA2, a polarizing layer POL, a bending protective layer BPL, a first protective layer PT, a glass UTG and a second protective layer PL.

The first adhesive layer PSA1 may protrude outward than the polarizing layer POL. That is, the first adhesive layer PSA1 may protrude in the first direction DR1 than the polarizing layer POL. The bending protective layer BPL may be disposed to overlap the second protective layer PL.

Unlike FIG. 5, depending on the degree to which the first adhesive layer PSA1 protrudes from the polarizing layer POL, the bending protective layer BPL may overlap the glass UTG and the second protective layer PL at the same time.

Figure 6:
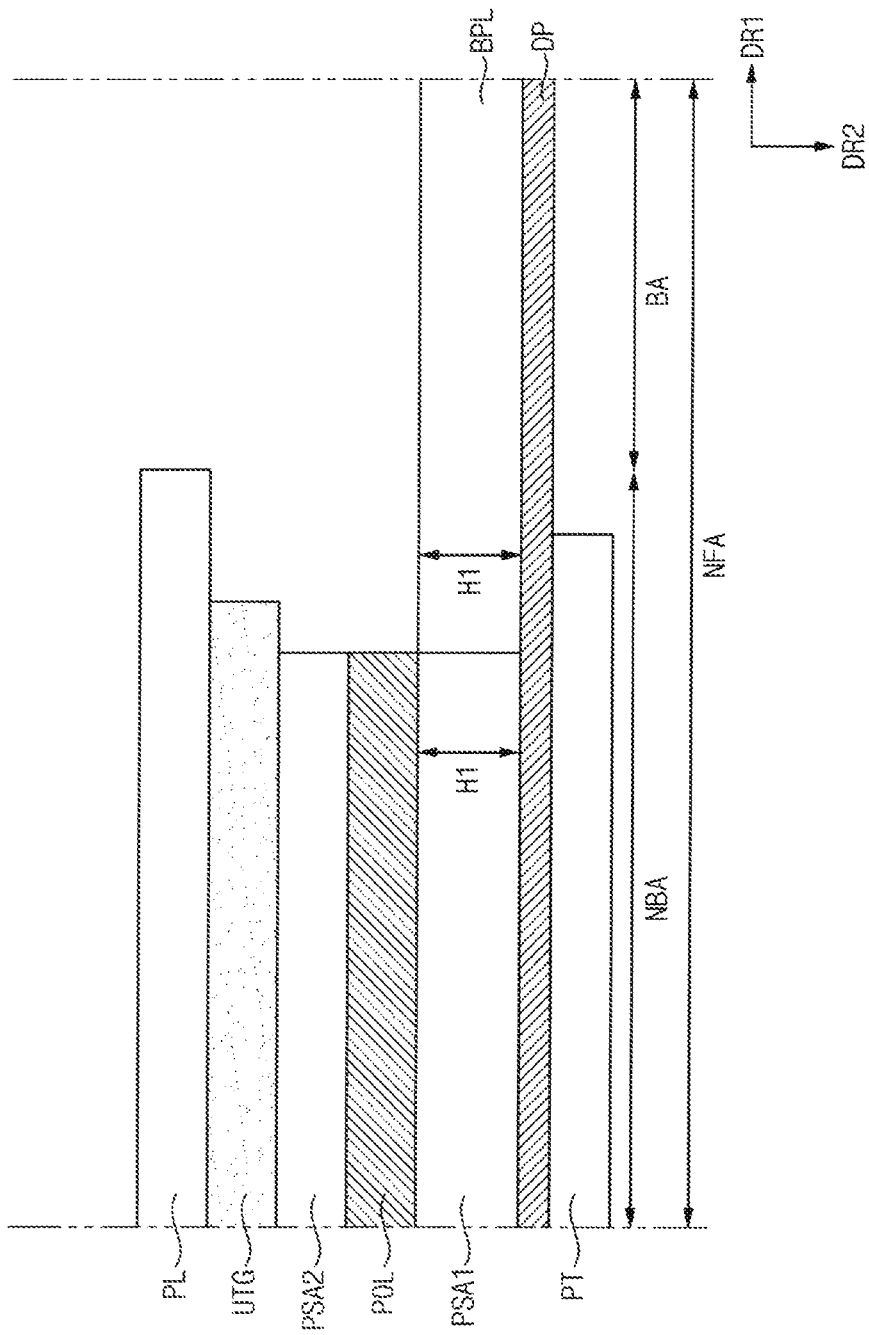

Referring to FIGS. 1 and 6, the display device DD may include a display panel DP, a first adhesive layer PSA1, a second adhesive layer PSA2, a polarizing layer POL, a bending protective layer BPL, a first protective layer PT, a glass UTG, and a second protective layer PL.

The bending protective layer BPL and the first adhesive layer PSA1 may each have the same first height H1. Accordingly, even when the polarizing layer POL slips when the display device DD is folded, an impact may not be applied to the bending protective layer BPL. In addition, the bending protective layer BPL may have a substantially great thickness to protect the bending area BA of the display panel DP from stress applied to the bending area BA of the display panel DP.

Figure 7:
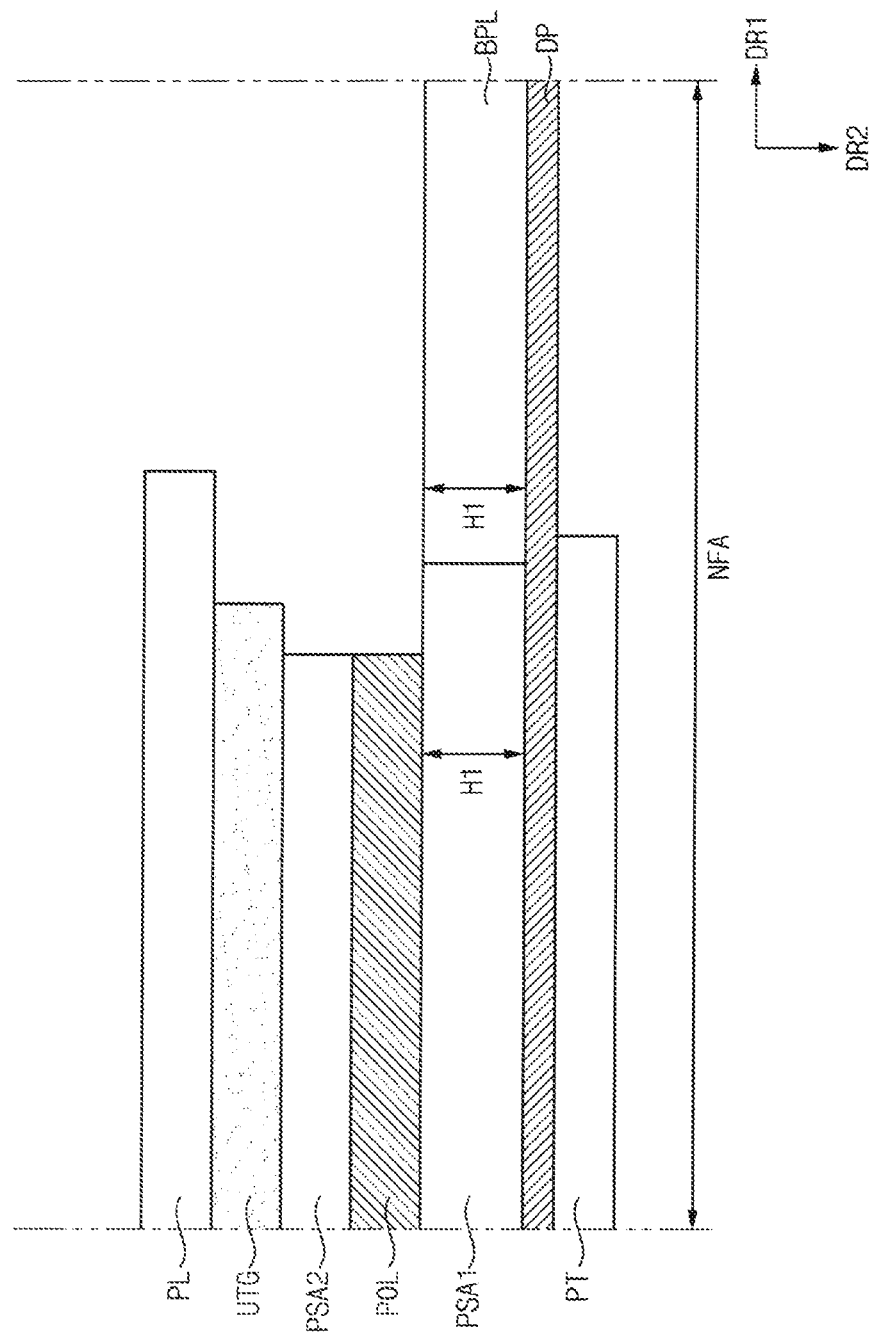

Referring to FIGS. 1 and 7, the first adhesive layer PSA1 may protrude outward than the polarizing layer POL. That is, the first adhesive layer PSA1 may protrude in the first direction DR1 than the polarizing layer POL. The bending protective layer BPL may be disposed to overlap the second protective layer PL.

Unlike FIG. 7, depending on the degree to which the first adhesive layer PSA1 protrudes from the polarizing layer POL, the bending protective layer BPL may overlap the glass UTG and the second protective layer PL at the same time.

Figure 8:
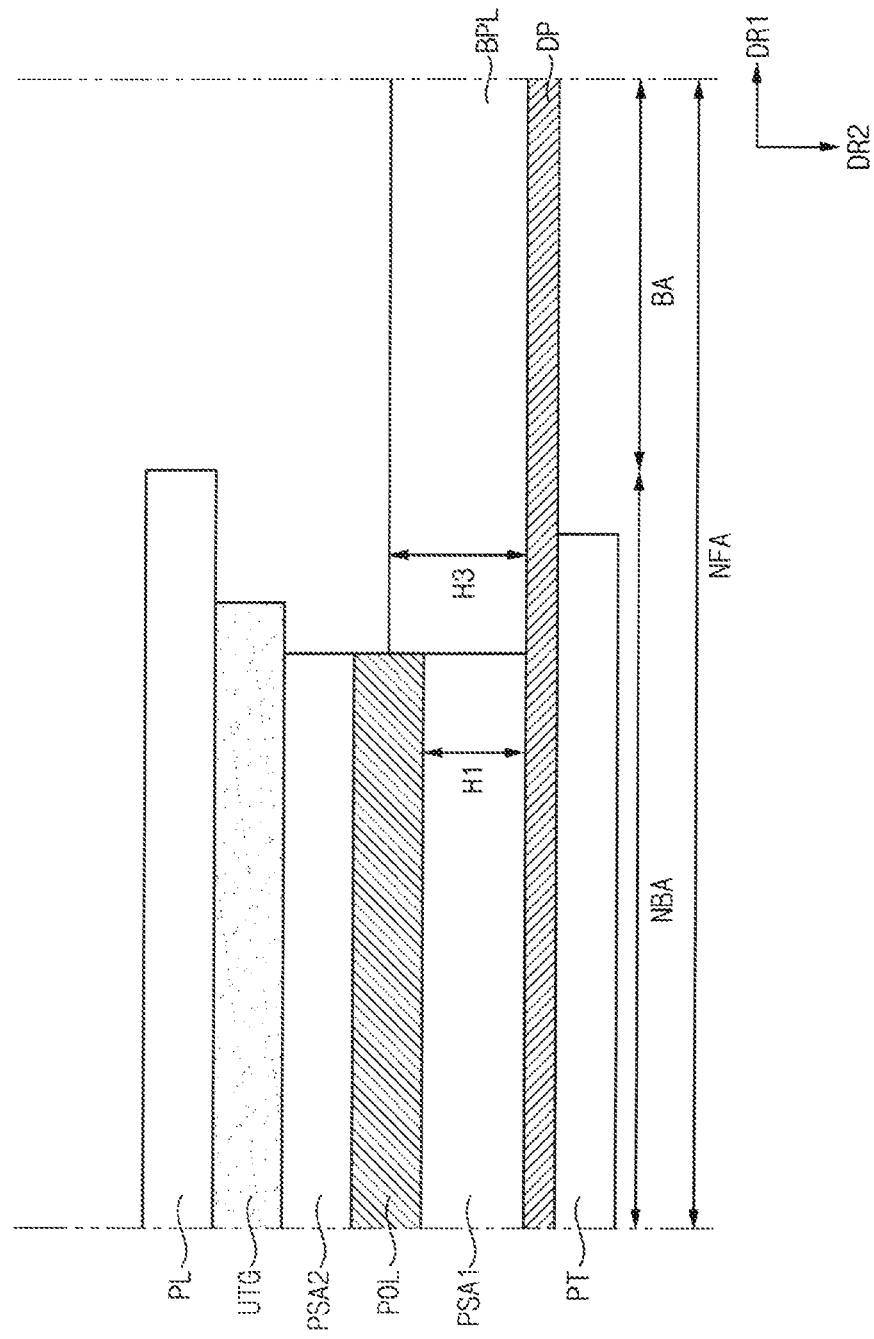

Referring to FIGS. 1 and 8, the display device DD may include a display panel DP, a first adhesive layer PSA1, a second adhesive layer PSA2, a polarizing layer POL, a bending protective layer BPL, a first protective layer PT, a glass UTG, and a second protective layer PL.

The first adhesive layer PSA1 may have a first height H1. The bending protective layer BPL in contact with the first adhesive layer PSA1 may have a third height H3 higher than the first height H1. In an embodiment, the third height H3 may be typically about 50 μm to about 75 In an embodiment, the first height H1, which is the height of the first adhesive layer PSA1, may be about 50 μm.

When the display device DD is folded, the polarizing layer POL may slip in the first direction DR1. In this case, pressure may be applied to the bending protective layer BPL by the polarizing layer POL.

When the modulus of the bending protective layer BPL is high, the bending protective layer BPL may have rigidity. In this case, defects such as cracks may occur in the bending protective layer BPL due to the pressure applied from the slipping polarizing layer POL. To prevent this, the bending protective layer BPL may preferably include a material having a low modulus.

In an embodiment, a bending protective layer BPL may use a material having a modulus of about 860 MPa as it approaches about −20 degrees Celsius, and a modulus that converges to zero as it approaches about 60 degrees Celsius. Accordingly, even when an external impact is applied to the bending protective layer BPL, the bending protective layer BPL has ductility, so that the possibility of defects such as cracks occurring in the bending protective layer BPL may be reduced. That is, even when the polarizing layer POL slips, cracks do not occur in the bending protective layer BPL, and a shape of a portion of the bending protective layer BPL may be deformed.

Figure 9:
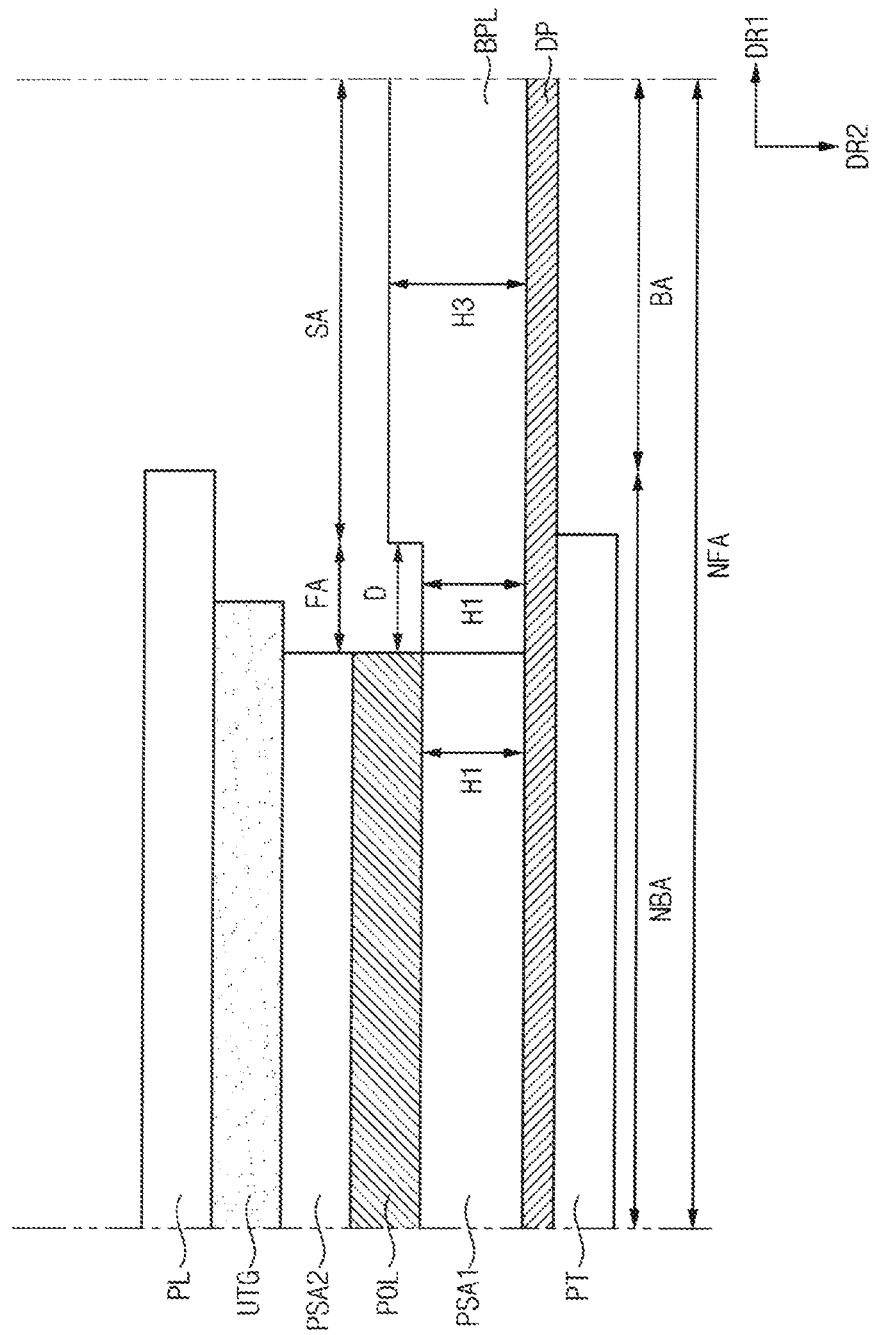

Referring to FIGS. 1 and 9, the bending protective layer BPL may be divided into a first portion FA having a first height H1 and a second portion SA having a third height H3. As the bending protective layer BPL has a step difference, the bending protective layer BPL may not receive pressure from the polarizing layer POL even when the polarizing layer POL slips when the display device DD is folded. In an embodiment, a distance D between the adhesive layer and the second portion SA may be about 50 μm to about 150 μm.

Figure 12:
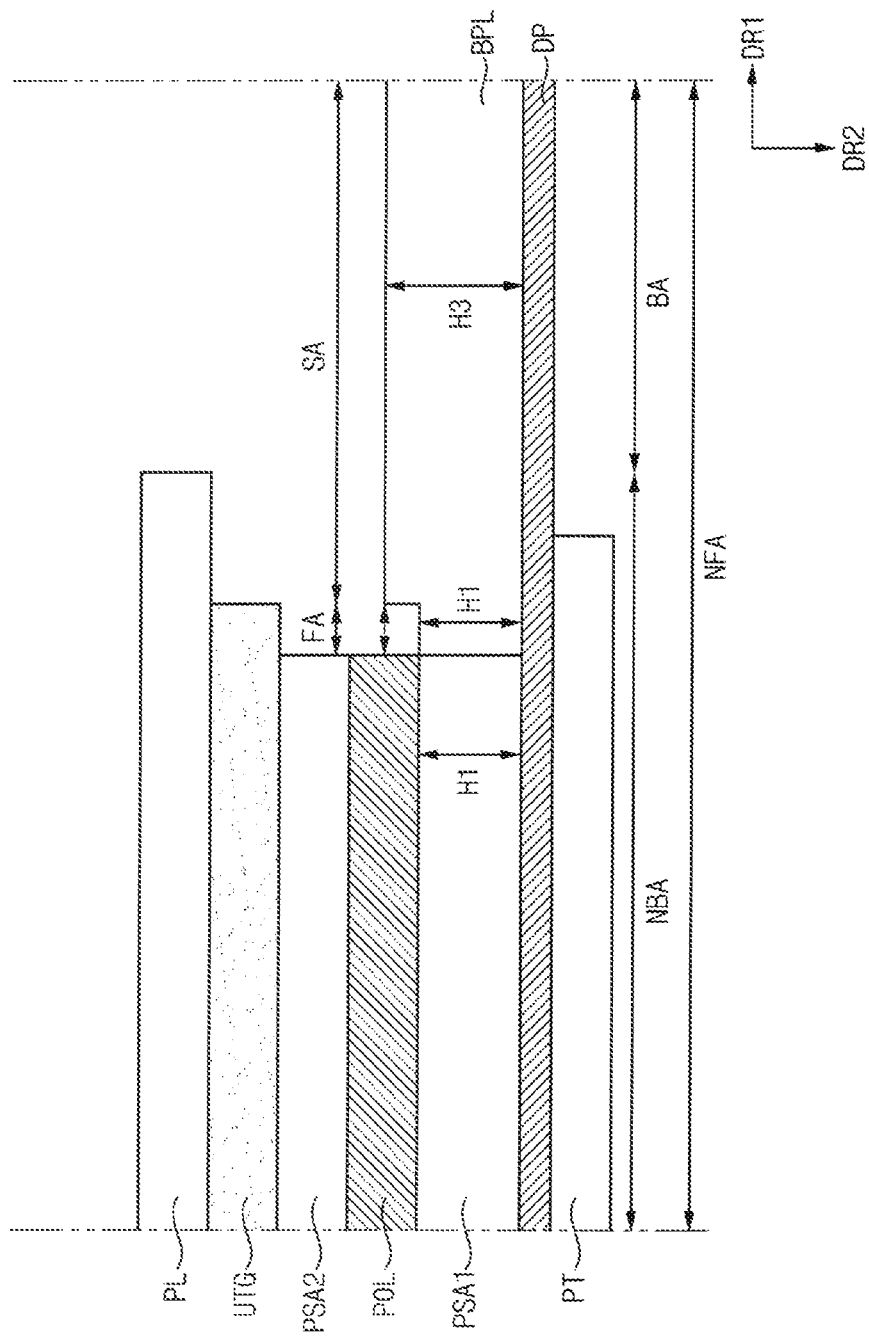

In some embodiments, the second portion SA may overlap the second protective layer PL, but may not overlap the glass UTG. However, when the slippage of the polarizing layer POL is insignificant, as shown in FIG. 12, the second portion SA may overlap the second protective layer PL and the glass UTG at the same time.

Figure 10:
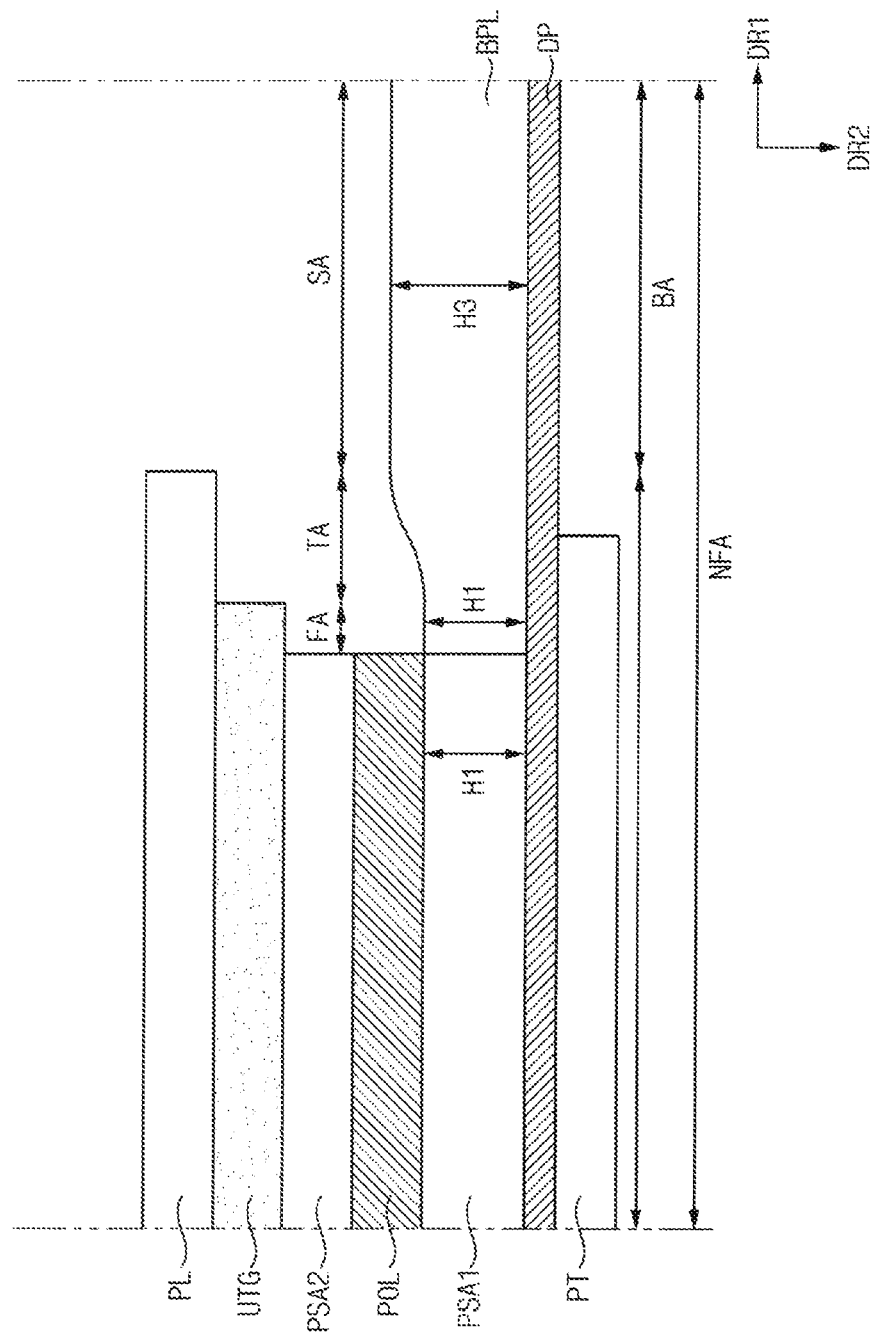
Figure 11:
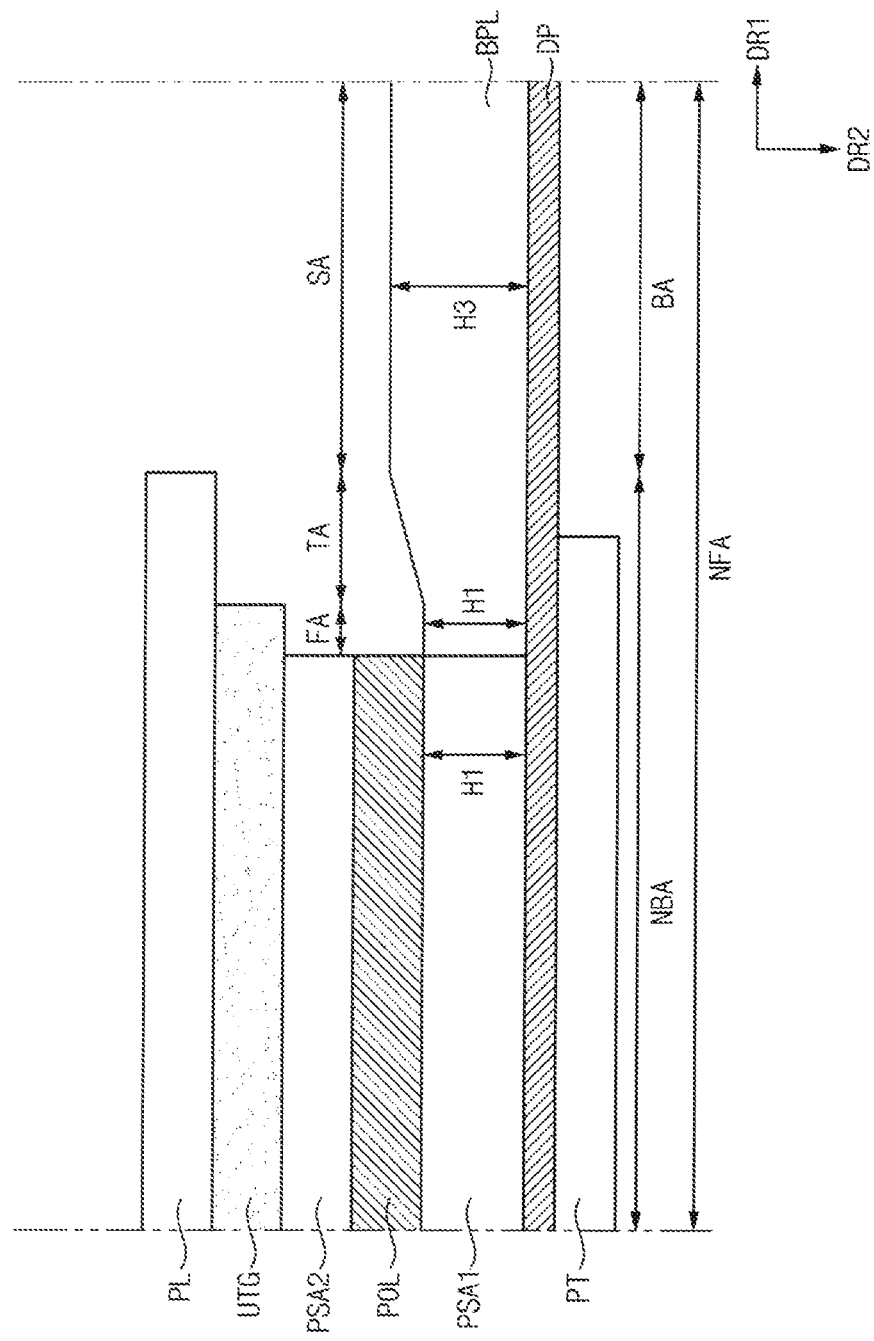

Referring to FIGS. 1 and 10, a third portion TA may exist between the first portion FA and the second portion SA of the bending protective layer BPL. A height of the third portion TA may gradually increase in a parabolic shape from the first portion FA to the second portion SA. In an alternative embodiment, as shown in FIG. 11, the third portion TA may increase in height from the first portion FA to the second portion SA with a constant slope. The third portion TA may have a height similar to the first height H1 in a portion adjacent to the first portion FA and nay have a height similar to the third height H3 in a portion adjacent to the second portion SA.

Figure 13:
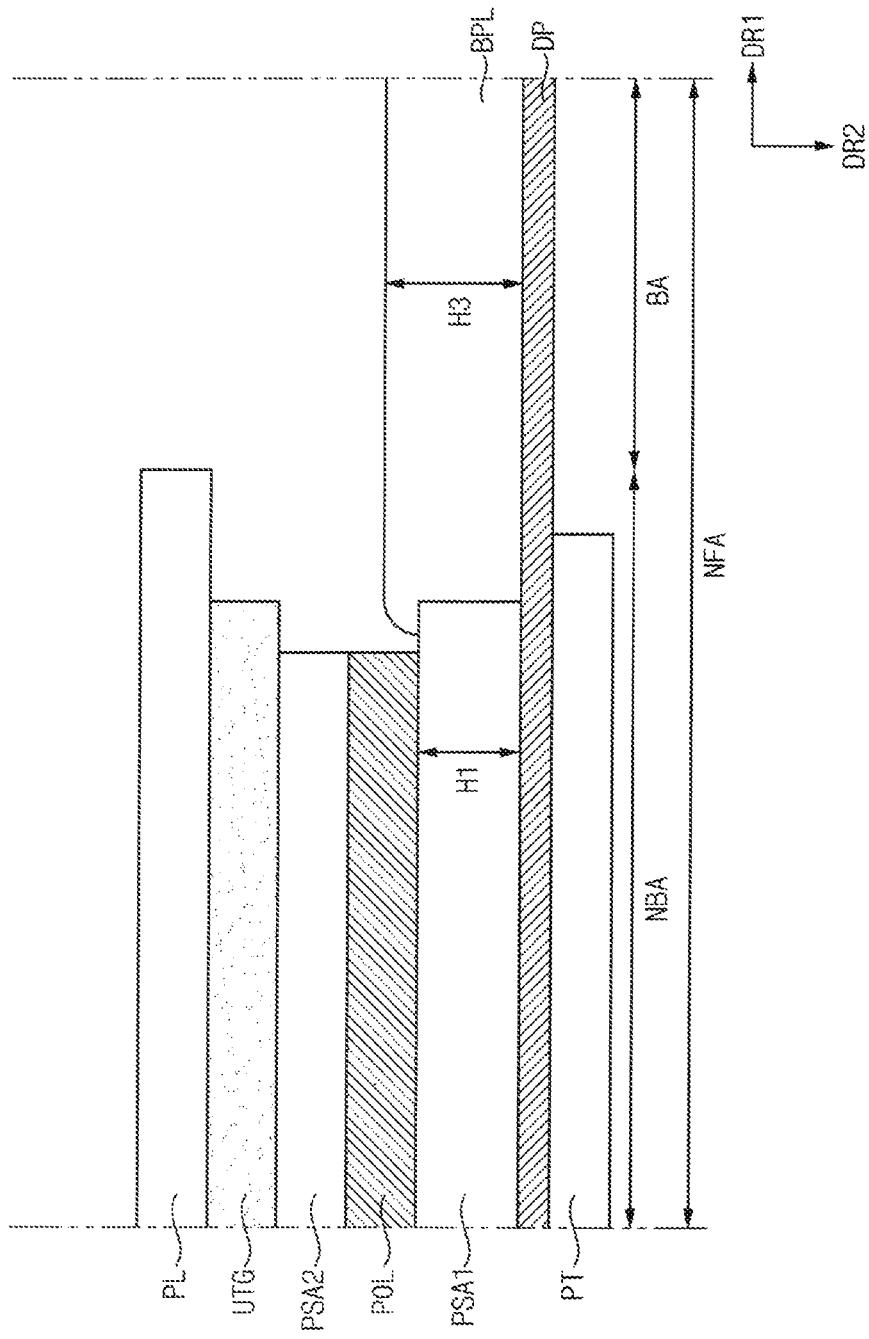

Referring to FIGS. 1 and 13, the bending protective layer BPL may be disposed to contact a side surface of the first adhesive layer PSA1 and partially cover an upper surface of the first adhesive layer PSA1. In this case, the bending protective layer BPL may overlap the second protective layer PL and the glass UTG at the same time.

Figure 14:
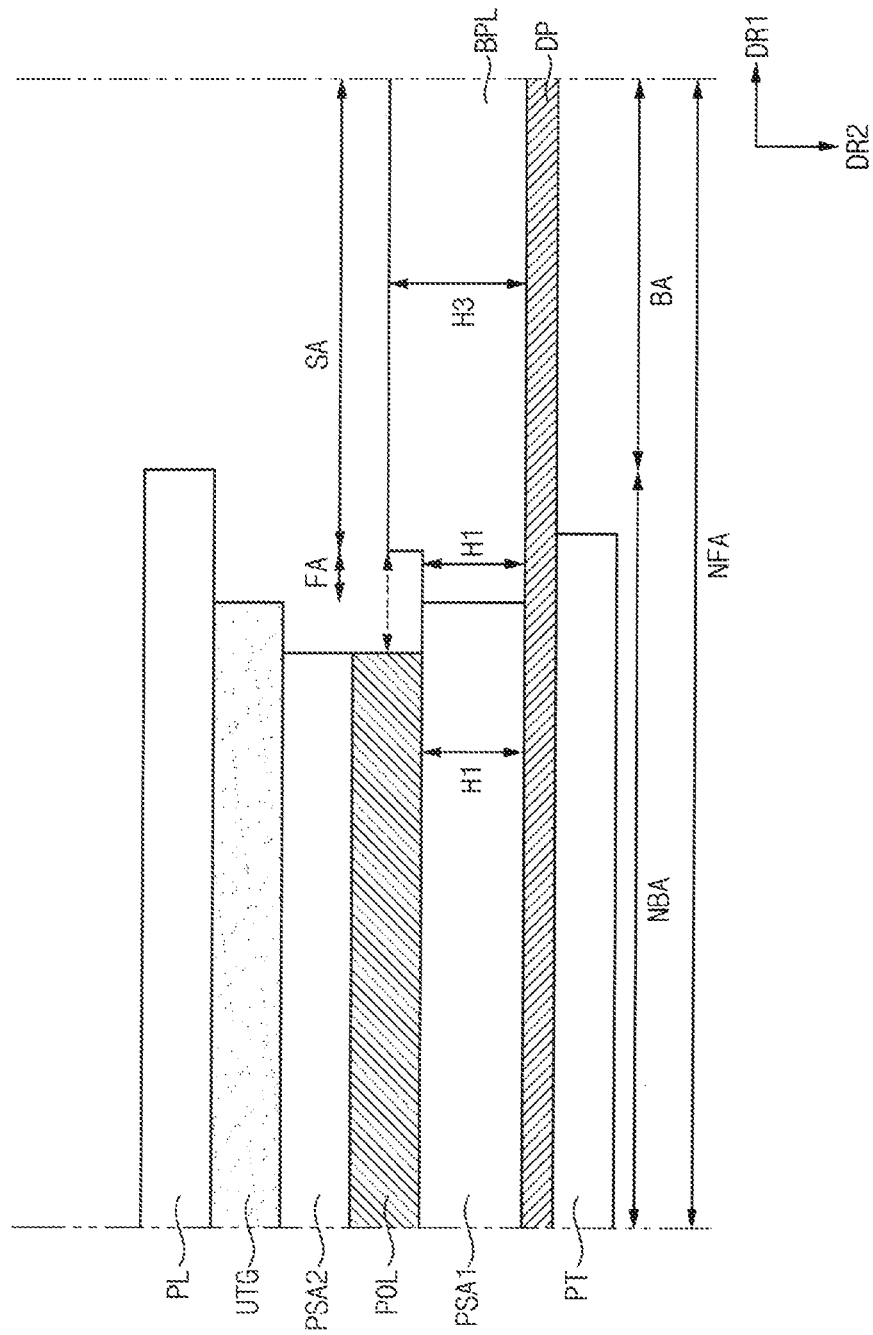

Referring to FIGS. 1 and 14, when the polarizing layer POL slips, a shape of the bending protective layer BPL may be deformed by pressure received from the polarizing layer POL due to a low modulus. Accordingly, a shape of a portion of the bending protective layer BPL that is pressed by the polarizing layer POL may be deformed. Accordingly, the bending protective layer BPL may be divided into a first portion FA having a first height H1 and a second portion SA having a third height H3.

Figure 15:
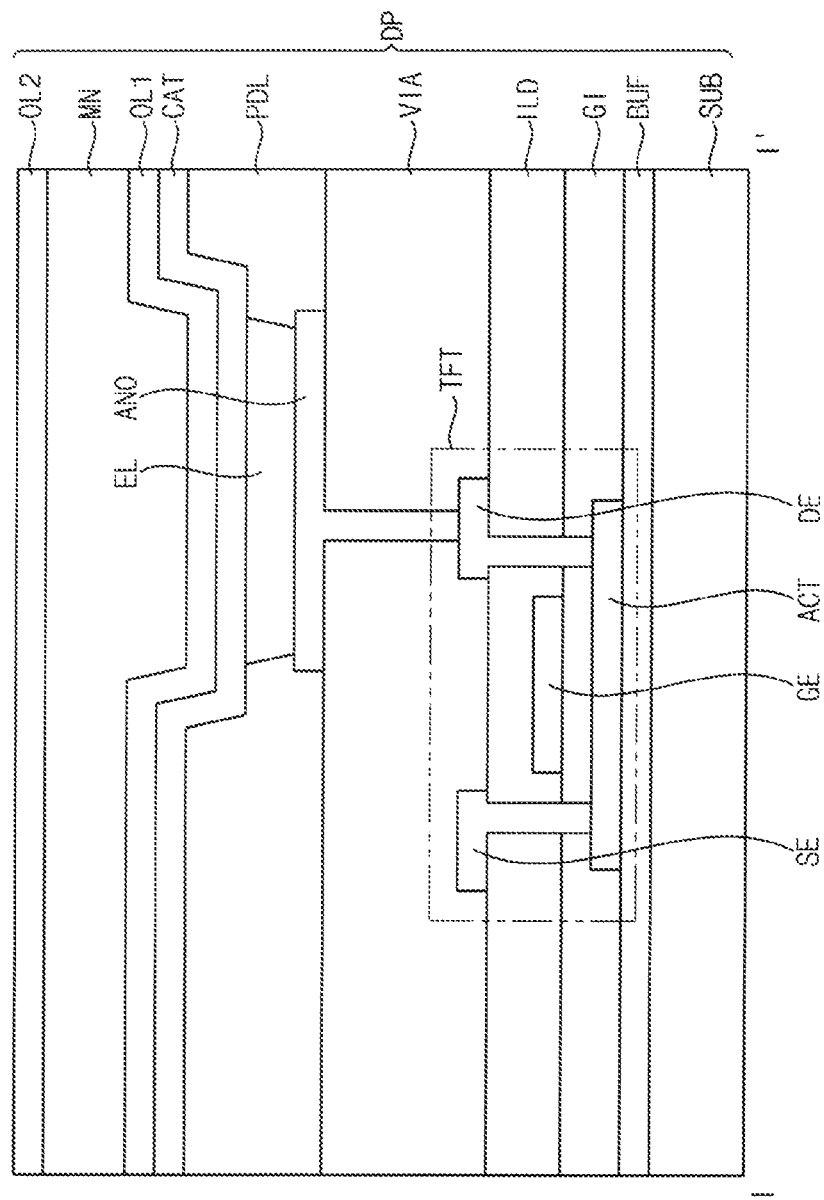
FIG. 15 is a cross-sectional view illustrating an embodiment of a display panel included in the display device of FIG. 1.

FIG. 15 is a cross-sectional view illustrating an embodiment of a display panel included in the display device of FIG. 1.

Referring to FIGS. 1 and 15, the display panel DP of FIG. 1 may include a substrate SUB, a buffer layer BUF, a transistor TFT, a gate insulating layer GI, an inter-insulating layer ILD, a via-insulating layer VIA, a pixel defining layer PDL, a light-emitting element, and an encapsulation layer. The transistor TFT may include an active layer ACT, a gate electrode GE, a source electrode SE, and a drain electrode DE. The light-emitting element may include a first electrode ANO, a light-emitting layer EL, and a second electrode CAT. The encapsulation layer may include a first inorganic encapsulation layer OL1, an organic encapsulation layer MN, and a second inorganic encapsulation layer OL2.

The substrate SUB may include a transparent or opaque material. The substrate SUB may include plastic, and accordingly, the substrate SUB may have a flexible characteristic. In an embodiment, the substrate SUB may include polyimide. In this case, the substrate SUB may have a structure in which one or more polyimide layers and one or more barrier layers are alternately stacked.

The buffer layer BUF may be disposed on the substrate SUB. The buffer layer BUF may block the diffusion of metal atoms or impurities from the substrate SUB to the transistor TFT. Also, the buffer layer BUF may control a heat transfer rate during a crystallization process for forming the active layer ACT.

The active layer ACT may be disposed on the buffer layer BUF. In an embodiment, the active layer ACT may include a silicon semiconductor or an oxide semiconductor.

In an embodiment, the material that may be used for the silicon semiconductor may include amorphous silicon, polycrystalline silicon, or the like. These may be used alone or in combination with each other.

In an embodiment, materials that may be used as the oxide semiconductor may include at least one of zinc oxide (ZnOx), gallium oxide (GaOx), titanium oxide (TiOx), tin oxide (SnOx), indium oxide (InOx), indium-gallium oxide ("IGO"), indium-zinc oxide ("IZO"), indium-tin oxide ("ITO"), gallium-zinc oxide ("GZO"), zinc-magnesium oxide ("ZMO"), zinc-tin oxide ("ZTO"), zinc-zirconium oxide (ZnZrxOy), indium-Gallium-zinc oxide ("IGZO"), indium-zinc-tin oxide ("IZTO"), indium-gallium-hafnium oxide ("IGHO"), tin-aluminum-zinc oxide ("TAZO"), indium-gallium-tin oxide ("IGTO"), etc. These may be used alone or in combination with each other.

The gate insulating layer GI may cover the active layer ACT and may be disposed on the buffer layer BUF. The gate insulating layer GI may include an insulating material. In an embodiment, the insulating material that may be used as the gate insulating layer GI may include silicon oxide (SiOx), silicon nitride (SiNx), silicon oxynitride (SiON), or the like. These may be used alone or in combination with each other.

The gate electrode GE may be disposed on the gate insulating layer GI. The gate electrode GE may include a metal, an alloy, a conductive metal oxide, a transparent conductive material, or the like. In an embodiment, materials that may be used as the gate electrode GE include silver (Ag), an alloy including silver, molybdenum (Mo), an alloy including molybdenum, aluminum (Al), an alloy including aluminum, aluminum nitride (AlN), tungsten (W), tungsten nitride (WN), copper (Cu), nickel (Ni), chromium (Cr), chromium nitride (CrN), titanium (Ti), tantalum (Ta), platinum (Pt), scandium (Sc), ITO, IZO, or the like. These may be used alone or in combination with each other.

The inter-insulating layer ILD may cover the gate electrode GE and may be disposed on the gate insulating layer GI. The inter-insulating layer ILD may include an insulating material.

The source electrode SE and the drain electrode DE may be disposed on the inter-insulating layer ILD. The source electrode SE and the drain electrode DE may contact the active layer ACT. The source electrode SE and the drain electrode DE may include a metal, an alloy, a conductive metal oxide, a transparent conductive material, or the like. However, the invention is not limited thereto, and in another embodiment, the source electrode SE and the drain electrode DE may be switched with each other according to a type of the transistor.

The via-insulating layer VIA may cover the source electrode SE and the drain electrode DE, and may be disposed on the inter-insulating layer ILD. The via-insulating layer VIA may include an organic insulating material. In an embodiment, the material that may be used as the via-insulating layer VIA may include at least one of photoresist, polyacrylic resin, polyimide resin, acrylic resin, etc. These may be used alone or in combination with each other.

The first electrode ANO may be disposed on the via-insulating layer VIA. The first electrode ANO may be connected to the drain electrode DE through a contact hole defined by removing a portion of the via-insulating layer VIA. The first electrode ANO may include a metal, an alloy, a conductive metal oxide, a transparent conductive material, or the like. In some embodiments, the first electrode ANO may be an anode electrode. However, the invention is not limited thereto, and in another embodiment, the first electrode ANO may be a cathode electrode.

The pixel defining layer PDL may be disposed on the via-insulating layer VIA to expose the first electrode ANO. An opening OP exposing the first electrode ANO may be defined in the pixel defining layer PDL. The pixel defining layer PDL may include an organic material. In an embodiment, the material that may be used as the pixel defining layer PDL may include photoresist, polyacrylic resin, polyimide resin (particularly, photosensitive polyimide resin ("PSPI")), acrylic resin, or the like. These may be used alone or in combination with each other.

The light-emitting layer EL may be disposed on the first electrode ANO. The light-emitting layer EL may contact the first electrode ANO in the opening OP. In some embodiments, the light-emitting layer EL may include an organic light-emitting layer emitting red light, an organic light-emitting layer emitting green light, or an organic light-emitting layer emitting blue light. In addition, the light-emitting layer EL may further include a hole injection layer, a hole transport layer, an electron injection layer, and an electron transport layer.

The second electrode CAT may be disposed on the light-emitting layer EL. The second electrode CAT may be disposed to cover the light-emitting layer EL and the pixel defining layer PDL. The second electrode CAT may include a metal, an alloy, a conductive metal oxide, a transparent conductive material, or the like. In some embodiments, the second electrode CAT may be a cathode electrode. However, the invention is not limited thereto, and in another embodiment, the second electrode CAT may be an anode electrode.

The encapsulation layer may be disposed on the second electrode CAT. Specifically, the first inorganic encapsulation layer OL1, the organic encapsulation layer MN, and the second inorganic encapsulation layer OL2 may be sequentially stacked. However, the invention is not limited thereto, and the encapsulation layer may have a structure in which a plurality of inorganic encapsulation layers and a plurality of organic encapsulation layers are stacked on each other.

The encapsulation layer may prevent oxygen and/or moisture from penetrating into the light-emitting element. The first inorganic encapsulation layer OL1 and the second inorganic encapsulation layer OL2 may include an inorganic material. The organic encapsulation layer MN may include an organic material.

Figure 16:
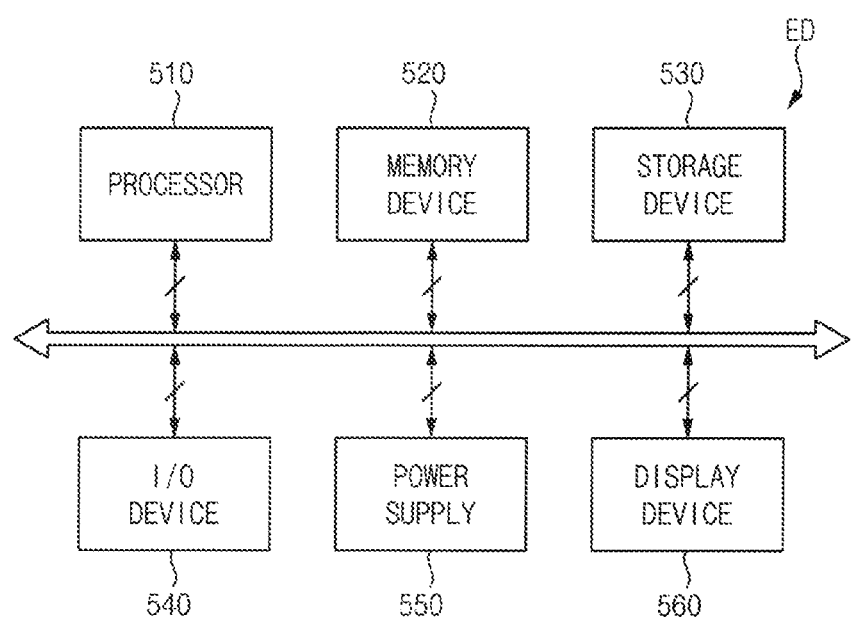
FIG. 16 is a block view illustrating an embodiment of an electronic device.
Figure 17:
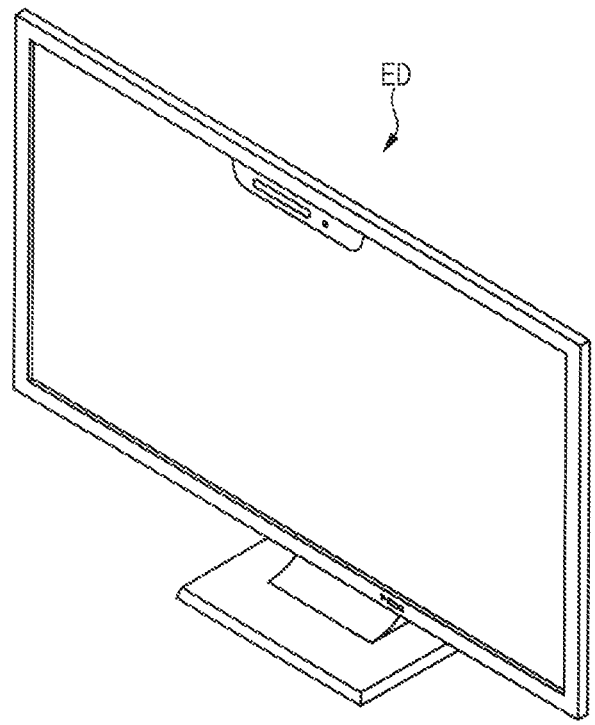
FIG. 17 is a view illustrating an embodiment in which the electronic device of FIG. 16 is implemented as a computer monitor.
Figure 18:
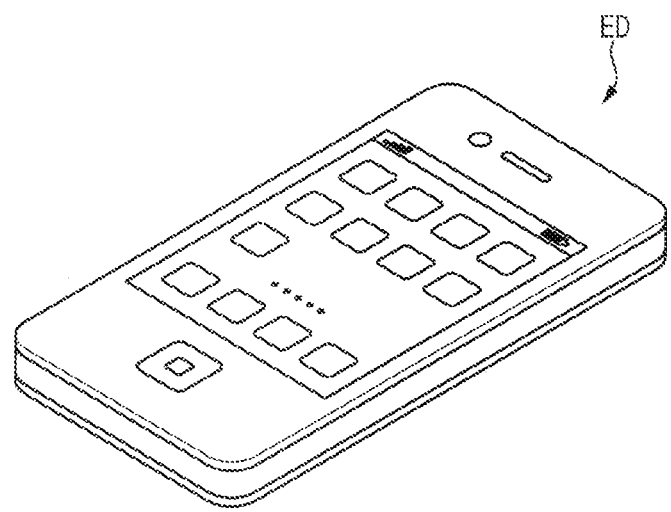
FIG. 18 is a view illustrating an embodiment in which the electronic device of FIG. 16 is implemented as a smartphone.

FIG. 16 is a block view illustrating an embodiment of an electronic device, FIG. 17 is a view illustrating an embodiment in which the electronic device of FIG. 16 is implemented as a computer monitor and FIG. 18 is a view illustrating an embodiment in which the electronic device of FIG. 16 is implemented as a smartphone.

Referring to FIGS. 16, 17 and 18, an embodiment of an electronic device ED may include a processor 510, a memory device 520, a storage device 530, an input/output ("I/O") device 540, a power supply 550, and a display device 560. In such an embodiment, the display device 560 may correspond to the display device described above with reference to the above drawings. The electronic device ED may further include several ports capable of communicating with a video card, a sound card, a memory card, a universal serial bus ("USB") device, or the like. In an embodiment, as illustrated in FIG. 17, the electronic device ED may be implemented as a computer monitor. In an alternative embodiment, as illustrated in FIG. 18, the electronic device ED may be implemented as a smartphone. However, the electronic device ED is not limited thereto, and for example, the electronic device ED includes a mobile phone, a video phone, a smart pad, a smart watch, a tablet personal computer ("PC"), a vehicle navigation system, it may be implemented as a computer monitor, notebook computer, head mounted display ("HMD"), or the like.

The processor 510 may perform predetermined calculations or tasks. In an embodiment, the processor 510 may be a microprocessor, a central processing unit ("CPU"), an application processor ("AP"), or the like. The processor 510 may be connected to other components through an address bus, a control bus, a data bus, or the like. In an embodiment, the processor 510 may also be connected to an expansion bus such as a peripheral component interconnect ("PCI") bus.

The memory device 520 may store data used for the operation of the electronic device ED. In an embodiment, for example, the memory device 520 may include nonvolatile memory device such as an erasable programmable read-only memory ("EPROM") device, an electrically erasable programmable read-only memory ("EEPROM") device, a flash memory device, and a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, and/or volatile memory device such as a dynamic random access memory ("DRAM") device, a static random access memory ("SRAM") device, a mobile DRAM device.

In an embodiment, the storage device 530 may include a solid state drive ("SSD"), a hard disk drive ("HDD"), a compact disc read-only memory ("CD-ROM"), or the like. In an embodiment, the I/O device 540 may include an input means such as a keyboard, a keypad, a touch pad, a touch screen, and a mouse, and an output means such as a speaker and a printer.

The power supply 550 may supply power desired for the operation of the electronic device ED. The display device 560 may be coupled to other components via buses or other communication links. In an embodiment, the display device 560 may be included in the I/O device 540.

Although embodiments and implementations have been described herein, other embodiments and modifications will be apparent from this description. Accordingly, the invention are not limited to such embodiments, but rather to the broader scope of the appended claims and various obvious modifications and equivalent arrangements as would be apparent to a person of ordinary skill in the art.

What is claimed is:

1. A foldable display device comprising:
    a display panel including:
        a first non-folding area including a bending area and a non-bending area;
        a folding area connected to the first non-folding area; and
        a second non-folding area spaced apart from the first non-folding area by the folding area,
        wherein the bending area of the first non-folding area is spaced apart from the folding area;
    an adhesive layer disposed on the non-bending area of the display panel and having a first height in a direction perpendicular to a main plane extension direction of the display panel;
    a polarizing layer disposed on the adhesive layer; and
    a bending protective layer disposed on the bending area of the display panel and having a second height, in the direction, less than the first height.

2. The foldable display device of claim 1, wherein a modulus of the bending protective layer is greater than about 0 and less than or equal to about 860 megapascals.

3. The foldable display device of claim 2, wherein the modulus of the bending protective layer increases from a high temperature to a low temperature.

4. The foldable display device of claim 1, wherein a modulus of the adhesive layer is about 0.1 megapascal or less.

5. The foldable display device of claim 1, wherein a modulus of the bending protective layer is greater than about 0 and less than or equal to about 860 megapascals, and
    wherein a modulus of the adhesive layer is about 0.1 megapascal or less.

6. The foldable display device of claim 1, wherein the bending protective layer is in contact with the adhesive layer.

7. The foldable display device of claim 1, further comprising:
    a glass disposed on the polarizing layer; and
    a protective layer disposed on the glass.

8. A foldable display device comprising:
    a display panel including a first non-folding area including a bending area and a non-bending area, a folding area connected to the first non-folding area, and a second non-folding area spaced apart from the first non-folding area by the folding area, wherein the bending area of the first non-folding area is spaced apart from the folding area;
    an adhesive layer disposed on the non-bending area of the display panel and having a first height in a direction perpendicular to a main plane extension direction of the display panel;
    a polarizing layer disposed on the adhesive layer; and
    a bending protective layer disposed on the bending area of the display panel and having the first height in a first portion adjacent to the adhesive layer and having a second height, in the direction, different from the first height in a second portion spaced apart from the adhesive layer by the first portion.

9. The foldable display device of claim 8, wherein a modulus of the bending protective layer is greater than about 0 and less than or equal to about 860 megapascals.

10. The foldable display device of claim 9, wherein the modulus of the bending protective layer increases from a high temperature to a low temperature.

11. The foldable display device of claim 8, wherein a modulus of the adhesive layer is about 0.1 megapascal or less.

12. The foldable display device of claim 8, wherein a modulus of the bending protective layer is greater than about 0 and less than or equal to about 860 megapascals, and
    wherein a modulus of the adhesive layer is about 0.1 megapascal or less.

13. The foldable display device of claim 8, wherein the bending protective layer is in contact with the adhesive layer.

14. The foldable display device of claim 8, wherein a distance between the adhesive layer and the second portion is about 50 micrometers to about 150 micrometers.

15. The foldable display device of claim 14, wherein the second height is greater than the first height.

16. The foldable display device of claim 15, wherein the bending protective layer gradually increases in height from the first portion to the second portion.

17. The foldable display device of claim 8, wherein a length at which the second portion is spaced apart from the adhesive layer by the first portion is about 50 micrometers to about 150 micrometers.

18. The foldable display device of claim 8, further comprising:
    a glass disposed on the adhesive layer and protruding outward from the adhesive layer in a direction parallel to the main plane extension direction of the display panel; and
    a protective layer disposed on the glass and protruding outward from the glass in the direction parallel to the main plane extension direction of the display panel.

19. The foldable display device of claim 18, wherein the second portion overlaps the protective layer.

20. The foldable display device of claim 18, wherein the second portion overlaps the protective layer and the glass.

21. The foldable display device of claim 18, wherein the second portion overlaps the protective layer and does not overlap the glass.

22. A foldable display device comprising:
- a display panel including:
  - a first non-folding area including a bending area and a non-bending area;
  - a folding area connected to the first non-folding area; and
  - a second non-folding area spaced apart from the first non-folding area by the folding area;
- an adhesive layer disposed on the non-bending area of the display panel and having a first height in a direction perpendicular to a main plane extension direction of the display panel;
- a polarizing layer disposed on the adhesive layer; and
- a bending protective layer disposed on the non-bending area of the display panel, having the first height in a first portion adjacent to the adhesive layer, having a second height, in the direction, greater than the first height in a second portion spaced apart from the adhesive layer by the first portion, in contact with the adhesive layer and having a distance between the adhesive layer and the second portion spaced apart from each other by about 50 micrometers to about 150 micrometers.

23. The foldable display device of claim 22, wherein a modulus of the bending protective layer is greater than about 0 and less than or equal to about 860 megapascals, and
  wherein a modulus of the adhesive layer is about 0.1 megapascal or less.

\* \* \* \* \*